Jan. 27, 1948.  J. D. BOLESKY ET AL  2,434,984
THERMOSTATIC CONTROL
Filed June 17, 1943  3 Sheets-Sheet 1

John D. Bolesky,
Lewis W. Buell,
Inventors.
Haynes and Koenig,
Attorneys.

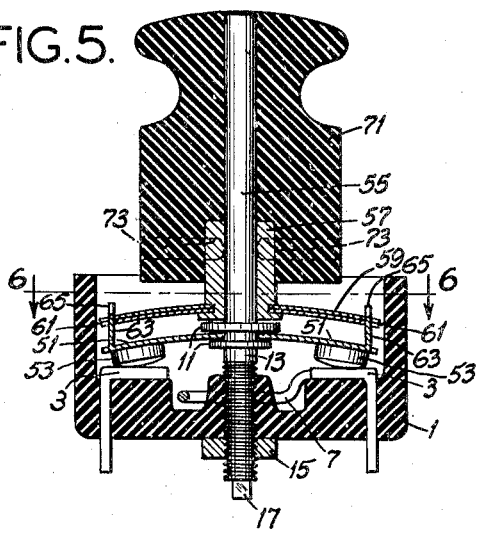
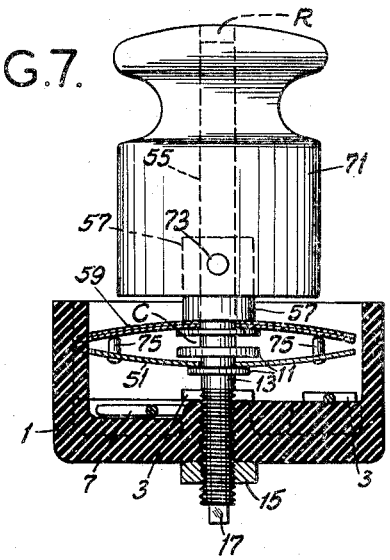
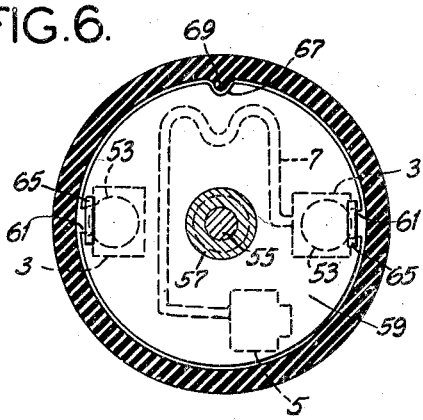
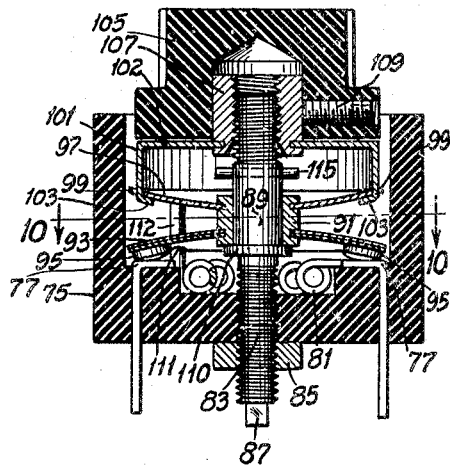
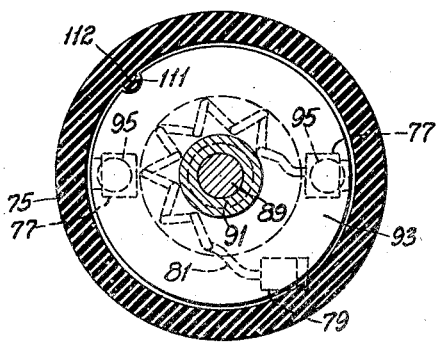

Patented Jan. 27, 1948

2,434,984

UNITED STATES PATENT OFFICE 2,434,984

THERMOSTATIC CONTROL

John D. Bolesky, Attleboro, and Lewis W. Buell, Rehoboth, Mass., assignors to Metals & Controls Corporation, Attleboro, Mass., a corporation of Massachusetts Application June 17, 1943, Serial No. 491,166

14 Claims. (Cl. 200—138)

This invention relates to thermostatic controls in general, and more specifically to manually and thermostatically controlled switches.

Among the several objects of the invention may be noted the provision of a compact form of thermostatic switch having in addition to its thermostatic action a simple manual control; the provision of a switch of the class described which may be constructed either for a push-pull or rotary action and also for trip free action, without in any case involving any substantial complexities; and the provision of a switch of the class described which may be made indicating. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiment of the invention, Fig. 1 is a vertical section showing one form of the invention in closed-circuit position, being a section on line 1—1 of Fig. 3;

Fig. 5 is a vertical section showing a trip free form of the invention in closed-circuit position;

Fig. 6 is a horizontal section taken on line 6—6 of Fig. 5;

Fig. 7 is a sectional view similar to Fig. 5 but at right angles thereto and showing the switch in manual open-circuit position, the push button thereof in this case being shown in elevation;

Fig. 9 is a vertical section showing a third form of the invention in a closed-circuit position;

Fig. 10 is a horizontal section taken on line 10—10 of Fig. 9; and

Similar reference characters indicate corresponding parts throughout the several views of the drawings.

Figure 1:
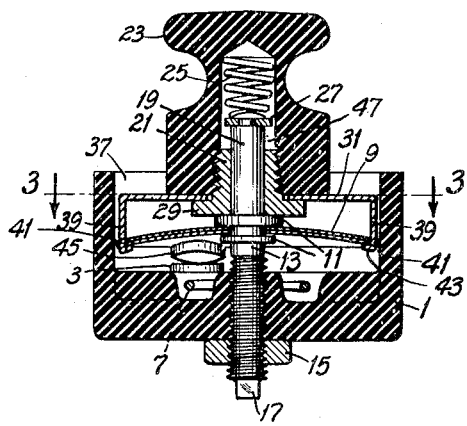

Referring now more particularly to Figs. 1 to 4, there is shown at numeral 1 a cup-shaped insulating base which carries fixed line terminal contacts 3. A third fixed terminal 5 is provided, between which, and one of the terminals 3 is a wire heating element 7. The purpose of this element is to heat and thus actuate when necessary the thermostatic element to be described. It is to be understood however that heating may also be effected by the ambient medium with or without the heating by wire 7.

The thermostatic element comprises a composite, preferably bimetallic, snap-acting thermostatic disc 9 of the general type, shown and described in Spencer United States Patent 1,448,-240, but designed to hold indefinitely either of its two over-centered positions of curvature when forced thereto manually, and adapted to snap from a normal cold to a hot position upon heating but requiring manual force for return to said cold position. Thermostatic discs so designed are known in the art. For circuit control purposes, the disc 9 is provided with movable contacts shown at 45 engageable and disengageable with the line terminals 3 when the disc 9 is respectively downwardly concave and upwardly concave. The disc 9 has a hole through its center and is loosely supported between spaced shoulders 11 carried on a post 13. The post is adjustably threaded into said base 1. This post 13 may be adjusted and held in any given adjustment by a lock nut 15. It has a squared end as indicated at 17 for wrench-engaging purposes.

Above the disc 9, the post 13 is made up as a cylindric guide 19 for a sliding collar 21. This collar carries a crosshead 29 (Fig. 3). The crosshead 29 has endwise depressed lugs 49 which are engageable with the edge of the thermostatic disc 9 when the latter is pushed down from its Fig. 2 position. To the collar is threaded an insulating control knob 23 which holds in position preferably at right angles and against the crosshead 29 a crossarm 31. The knob 23 is hollow and houses a compression spring 25, the upper end of which reacts against the inside of the knob and the lower end of which pushes against a washer 27 riveted to the end of the guide 19. The distance between the washer 27 and upper collar 11 is enough to allow for sliding motion of collar 21 on guide 19.

One end of the crosshead 29 is provided with a notch 33 which slidingly cooperates with a ridge 35 in the hollow portion 37 of the base. There is a similar notch 32 in the disc 9 located beneath notch 33. These notches prevent rotation of the assembly within the housing 1.

The cross arm 31 has downwardly extending legs 39 forming generally a U-shape. The legs 39 pass through notches 41 on the edge of the thermostatic disc 9. Beneath the notches, claws 43 reach within the notches. Thus by pulling out the knob 23, the disc 9 may be pulled upward at its edges to snap it from its downwardly concave, cold circuit-closing position (Fig. 1) to its upwardly concave, circuit-opening position (Fig. 2).

Figure 2:
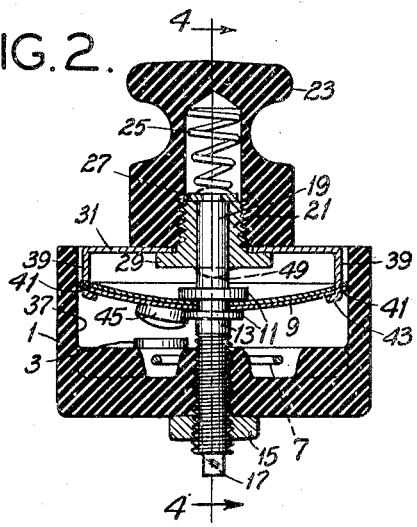
Fig. 2 is a view similar to Fig. 1 but showing the switch in open-circuit position.
Figure 3:
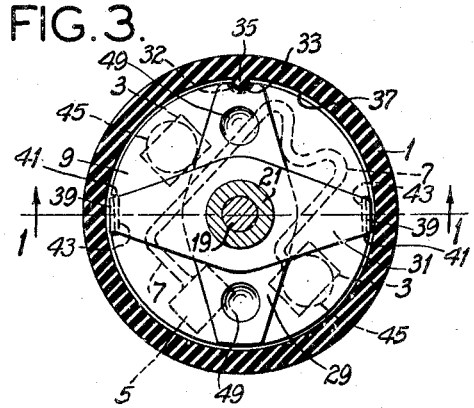
Fig. 3 is a horizontal section taken on line 3—3 of Fig. 1.
Figure 4:
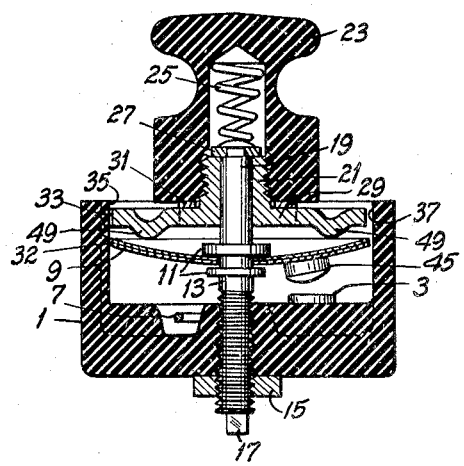
Fig. 4 is a vertical section taken on line 4—4 of Fig. 2.

Operation is as follows:

Referring again to the normal cold circuit-closing position of the device shown in Fig. 1, upon predetermined heating of the disc 9 it will snap to the upward concave position shown in Fig. 2. This pushes up the button 23 through contact between the edge of disc 9 and the lugs 49. The disc is so designed within the range of temperatures in which it is designed to operate, that when it cools it will not snap back to circuit-closing position. Thus the circuit will remain open until reclosed manually. Hence the disc constitutes a snap-acting circuit opening means responsive to temperature rise.

If at any time while the disc 9 is cold (downwardly concave), it is desired to open the circuit without awaiting heating of the disc, this may be accomplished by pulling out the button 23. This raises the slide collar 21 and hooks 43, thus pulling up the disc 9 by its edges. The resulting snapped condition is shown in Fig. 2. At this time, what was clearance 47 between the washer 27 and the upper end of the collar 21 is taken up, the washer 27 acting as a limiting stop. The spring 25 at this time holds up the assembly which is movable with the button 23. Hence the hooks 43 do not fall away from the disc 9.

If it is desired to reclose the circuit, this is done by pushing in on the button 23, whereupon the lug portions 49 of the arms 29 push down the edge of the disc, thus causing it to snap-act downward to the closed-circuit position shown in Fig. 1. This also re-compresses the spring 25. The disc 9 is stronger than the spring and hence the switch does not reopen.

This form of the invention is not fully trip free, that is, if the disc 9 has reached the position shown in Fig. 2 by heating, rather than by manual action and the disc is not yet cooled off, nevertheless, the circuit may be reclosed by pushing in the handle. It is true that the switch will again snap open when the handle is released because of the tendency for the disc under these conditions to snap to the open position, but a full trip free action is one in which it is not possible to hold the thermostat in circuit closing position during an overheated condition.

In Figs. 5 to 8 is shown another form of the invention again employing a push-pull handle, and which is trip free. Like numerals designate like parts where applicable. In this form, the shoulders 11 carry between them a lower snap-acting spring disc 51 (not thermostatic) which carries the contacts 53 for engaging the line terminals 3.

Figure 8:
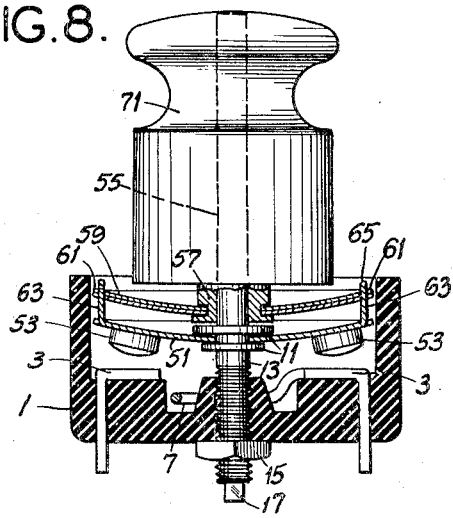
Fig. 8 is a view similar to Fig. 5; showing the switch in thermal open-circuit position.

In this form of the invention, the stem 13 is extended as shown at 55 for slidably carrying a sleeve 57. The sleeve 57 centrally supports an upper composite snap-acting disc 59 of the general character of the disc 9 referred to above, except that it will automatically snap in opposite directions in response to opposite temperature processes. This disc 59 has opposite edgewise notches 61 through which pass upwardly extending fingers 63 from the spring disc 51. These fingers 63 have lateral T-shaped extensions 65 above the notches 61, so that any upward snap action of the thermostatic disc 59 will be followed by an upward snap action of the spring disc 51. For this purpose, the thermostatic disc 59 is made stronger in action than the spring disc 51. Thus upward snapping of disc 59 in response to heating will pull up the disc 51 and both will then remain up as shown in Fig. 8, regardless of temperature changes, until returned manually, as will appear.

Both the spring discs 51 and the thermostatic disc 59 are held in predetermined angular position by notches 67 in their edges which slidingly engage a ridge 69 on the inside of the cup-shaped base 1 (see Figs. 6 and 7). As indicated in Figs. 5, 7 and 8, an insulating handle 71 slides on the extension 55 and is pinned to the sleeve 57 as indicated at 73 (Fig. 7). Spacing pillars 75 are riveted to the spring disc 51 for purposes to be described. They abut the disc 59.

Operation is as follows, the cold circuit-closed position of the device being shown in Fig. 5:

The thermostatic disc 59 is cold and bowed downward. The spring disc 51 is also bowed downward, so that the circuit is closed.

In Fig. 7 a manual opening operation is shown under cold conditions. This involves pulling up the button 71. The thermal disc 59 remains bowed downward, but the spring disc 51 being pulled up at its edges (see 63 and 65) snaps to open-circuit position. This introduces clearance C between the upper shoulder 11 and the slider 57. To reclose the circuit, the button 51 is pushed down as shown in Fig. 5. This again takes up the clearance C and snaps spring disc 51 down, the thermostatic disc 59 being stronger. Posts 75 provide the force transmitting means for this purpose.

Next, let it be assumed, starting with the closed-circuit position shown in Fig. 5, that heating occurs to an extent causing the thermal disc 59 to snap up as shown in Fig. 8. This draws up the edges of the spring disc 51 which snaps up and the circuit is suddenly opened. Now, if the ambient medium becomes cooler, the thermostatic disc 59 will cool off and snap its center up to the condition shown in Fig. 7. Then, by pushing down from the Fig. 7 position, the clearance C is taken up and at the same time, the spring disc 51 is snapped to the closed-circuit position, shown in Fig. 5.

On the other hand, referring to Fig. 8, had the ambient temperature remained hot, then a pushing in of the handle 71 would have failed to reclose the circuit because practically no clearance is available for handle movement. Referring to Fig. 5, there is likewise no clearance C, and the disc 59 cannot be prevented from snapping to open circuit position. Thus the device is not only trip-free, but the handle is absolutely immovable when the device is in the trip-free position. Before the circuit can be reclosed, the ambient medium must cool off, so that the thermostatic disc 59 will first snap up to the position shown in Fig. 7, after which the button may be pushed down to reclose the circuit. The recess at R is a visual indication that the circuit may be reclosed.

In Figs. 9 and 10 is shown another form of the invention in which the manual control is rotary instead of being push-pull. Since this form of the invention involves different shapes of most parts, new index numerals will be used.

Referring now to Figs. 9 and 10, numeral 75 indicates a cup-shaped base having line terminals 77 in its bottom along with a heater terminal 79 for a heater wire 81. A fixed threaded post is shown at 83 held in adjustable position by a lock-nut 85, and provided with a wrench-engaging head 87.

The post 83 has a guide portion 89 for a slider or carriage member 91. To the slider 91 is loosely attached a lower thermostatic bimetallic snap-acting disc 93, carrying contacts 95 engageable with the line terminals 77 when the disc is bowed down. The disc 93 is of the same type as that of Figs. 5–8, namely one which snaps one way or the reverse in accordance with inverse temperature functions. Spaced from the thermostatic disc 93 and also loosely attached centrally to the slider 91 is a mechanical spring disc 97, having notches 99 in its periphery. Through the notches 99 pass ears 103 which form grab hooks for the edge of the spring disc 97. The ears are on the lower edge of an inverted cup 101, the top 102 of which is under a rotary knob 105. The top 102 has a central rotary bearing on a nut 107, to which nut is attached the knob 105 (see set screw 109).

The assembly of the knob 105 and nut 107 is rotary with respect to the cup 101. Thus the nut 107 being threaded to the upper end of the stem 83 may be advanced or retracted axially by turning the knob 105. This advances and retracts the cup 101 which controls the axial position of the edge of the upper spring disc 97. In order to prevent rotation of the two discs 97 and 93, their edges are notched as shown at 111 for sliding engagement with a ridge 112 on the inside of the cup-shaped base 75.

At opposite ends of the guide 89 the post 83 carries stops. The lower stop is a shoulder 110 and the upper stop is a crosspin 115. These members are separated a distance allowing for limited axial movement of the slider 91.

Operation is as follows:

Fig. 9 shows a closed-circuit position under cold conditions. Upon a predetermined temperature rise, the thermostatic disc 93 will snap to its opposite curvature and thus open the circuit. Reaction is provided by shoulder 110. If it again cools, conditions otherwise remaining the same, the circuit will reclose.

Figure 11:
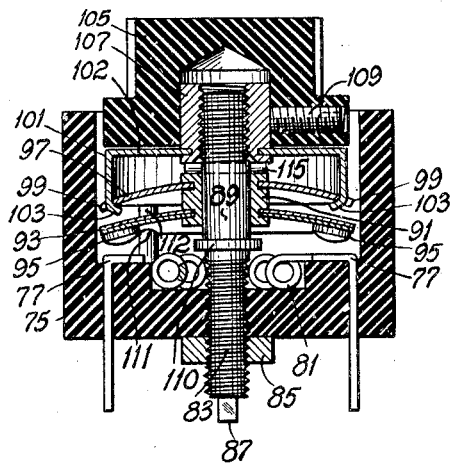
Fig. 11 is a view similar to Fig. 9 showing an open circuit position.

To open the switch manually, the knob 105 is rotated clockwise (looking down), thus threading the nut 109 downward on the upper end of the post 83. This pushes down (without rotating) the upper spring disc 97, but the central slider or carriage 91 cannot move. Therefore the disc 97 is overcentered. Its center then springs up with a snap action to pull up the slider 91 and the thermostatic disc 93 whether the latter is in hot or cold position. This draws up the contacts 95 (to open the circuit if closed), as shown in Fig. 11. This places the slider 91 up against the stop 115, so that when the knob 105 is turned counterclockwise (looking down), the edges of the spring disc 97 are pulled up while the upward motion of the central slider 91 is resisted by pin 115. This snaps the center of spring disc 97 back to the position shown in Fig. 9, and recloses the circuit if thermostatic disc 93 is in cold position.

It will be seen that the form of the invention shown in Figs. 9 and 10, like that of Figs. 5–8 is fully trip-free since it is impossible to hold the thermostatic disc 93 in its circuit closed position when the disc has reached its circuit-opening temperature.

It will be noted that the thermostatic disc 93 of Figs. 9 and 10, and disc 59 of the Figs. 5–8 both automatically snap in one direction upon heating and in the reverse direction upon cooling.

That is, they do not remain overcentered after heating and during cooling (until manually returned), as in the case of Figs. 1–4. This somewhat simplifies the procedure in making the thermostatic disc. That is, as is known, it is easier to make a disc which will snap back and forth in response to temperatures ups-and-downs, than to make one which upon temperature change in one direction will snap to another position and then remain there when the temperature process reverses.

Summarizing, it may be stated that the forms of the invention shown in Figs. 1 and 5 are of the so-called reset type of circuit breaker, meaning that they will open automatically in response to temperature rise from a predetermined cold position but will not reclose automatically upon temperature drop to the same cold value. They require a manual operation for reclosing them. In the Fig. 1 form, the requirement for manual reset inheres in the disc itself, but in the Fig. 5 form it does not inhere in the disc itself but in the manner in which it is mounted.

On the other hand, the Fig. 9 form of the invention is not of the so-called reset type, but as long as it is in its on position, as far as the handle 105 is concerned, it is an automatic circuit breaker which opens and closes the circuit in response to temperature rise and fall.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. A manually-operable thermostatic switch comprising a cup-shaped base, line terminals in the base of the cup, a normally fixed post adjustably threaded into said base, means for locking said post in a fixed position, a snap-acting thermostatic disc loosely affixed to said post during at least part of its operation and located in the cup, means for organizing contacts to become movable by said thermostatic disc whereby snap action of the disc moves the contacts to and from circuit-closing position with respect to said line terminals, a slider having axial motion on the post, and means connecting said slider and the thermostatic disc, whereby axial movement may be applied to at least a portion of the disc adjacent to the periphery to move said contacts to and from the line terminals.

2. A manually-operable thermostatic switch comprising a base, fixed line terminals on the base, a fixed post on the base, a slider having axial movement on the post, a thermostatic snap-acting disc and a non-thermostatic spring snap-acting disc coaxial with said post and the slider, at least one of said discs having terminal engaging elements and at least one of the discs being attached adjacent to the periphery to said slider for axial movement therewith, the slider being organized for cooperation upon movement with a fixed reaction point on the post to effect snap action of one disc which is transmitted to the other disc to move said terminal engaging elements to and from the line terminals.

3. A manually-operable thermostatic switch comprising a cup, line terminals in the base of the cup, a fixed post in the cup and extending from the base, a snap-acting thermostatic disc carried by the post in the cup, edgewise terminal-engaging elements carried by the disc and engageable with said line terminals, a button assembly on said post and having limited movement thereon, lateral arms extending from said assembly to engagement with opposite points on the edge of the disc to move said disc from its cold circuit-closing position to its hot circuit-opening position, and a second lateral arm extending from said assembly and having engagement with other points on the edge of the disc and adapted to force the disc from its open-circuit position to its closed-circuit position upon reverse movement of the button assembly.

4. A manually-operable thermostatic switch comprising a base, line terminals in the base, a fixed post in the base, a snap-acting thermostatic disc supported at its center on said post, contacts carried on the disc, said disc having a cold position in which the contacts close the circuit and being movable to an open-circuit position upon temperature rise but not returnable to closed circuit position upon temperature decrease, slide means on the post having limited movement thereon, means extending from said slide means and hooked under the edge of the disc at opposite points along one line, a second means extending from said slide and engageable with the edge of the disc and adapted to push it from its open-circuit to its closed-circuit position upon a reverse movement of the slide, a manual control button attached to said slide for moving it, and spring means reacting from said post to said button in a direction biasing the button toward its open-circuit position.

5. A manually-operable thermostatic switch comprising a support, line terminals thereon, movable contacts engageable therewith, a snap-acting spring element controlling said contacts and adapted indefinitely to maintain either of two snap positions in one of which the contacts are engaged and in the other disengaged, a snap-acting thermostatic element which is stronger than the snap-acting spring element, means coupling said elements adjacent to the periphery the coupled portions of the elements moving together, and manually movable means attached to the snap-acting thermal element at a point remote from the point of coupling with the spring element and having motion with respect to the point of support of said spring element.

6. A manually-operable thermostatic switch comprising a support, line terminals thereon, movable contacts engageable therewith, a snap-acting non-thermostatic spring disc element centrally supported at a point on the post and controlling said contacts and adapted indefinitely to maintain either of two snap positions, in one of which the contacts are engaged and in the other disengaged, a snap-acting thermostatic disc element which is stronger than the snap-acting spring element slidably carried along the post, means coupling the edges of the discs, coupled portions of the discs moving together, and manually movable means attached and carrying the snap-acting thermostatic element on the post at a point remote from the point of coupling with the spring element and having lost-motion with respect to the point of support of said spring element.

7. A thermostatic control comprising a fixed support, a snap-acting spring attached to said support at a central point and having a portion at another point movable during snap action, a snap-acting thermostatic element, sliding means supporting said thermostatic element on said fixed support, said thermostatic element being stronger than the spring element and having a movable portion remote from said sliding means, said elements being coupled for substantially equal movement at points adjacent their periphery and remote from their respective supports, and stop means on the fixed support for limiting movement of the sliding means carrying the thermostatic element, whereby movement of the thermostatic element in one direction in response to temperature change will snap the spring element, but reverse movement in response to reverse temperature change merely moves the sliding means.

8. A manually-operable thermostatic control comprising a fixed support, a non-thermostatic snap-acting spring disc attached centrally to said support at a fixed point and having an edge portion movable during snap action, a snap-acting thermostatic disc, a movable support for said thermostatic disc on said fixed support, said thermostatic disc being stronger than the spring element and having a movable edge remote from said sliding support, said discs being coupled at their edges for substantially equal edge movement, and stop means on the fixed support for limiting movement of the movable support for the thermostatic disc, whereby movement of the thermostatic element in one direction in response to temperature change will snap the spring element from an initial position, but reverse movement in response to reverse temperature moves the movable support away from said stop means, and manual means for pushing the movable support back against the stop to cause the thermostatic disc to move and through said edge coupling to snap the spring disc back to its initial position.

9. A manually-operable thermostatic control comprising fixed line terminals, a fixed post, a snap-acting spring disc centrally joined to said post and having a movable edge, a contact means adjacent said edge, a manually-controllable slider on the post, a snap-acting thermostatic disc having a central portion affixed to said slider and a movable edge, means coupling the edges of said discs, the thermostatic disc being mechanically stronger than the spring disc to control the latter, a stop between said discs whereby snap action in one direction of the thermostatic disc will move the edge of the spring disc, said slider having free movement away from said stop, whereby reverse snap action of the thermostatic disc will only move the slider away from the stop, said slider being manually movable to take up the clearance introduced by motion of the slider away from the stop to enforce reversal of position of said spring disc by moving the thermostatic disc.

10. A manually-operative thermostatic switch comprising a base, line terminals on the base, a fixed post on the base, spaced stops on the post, a slider on the post having movement between said stops, a snap-acting thermostatic disc attached to the slider, said disc carrying contacts movable to and from the line terminals upon movement of the slider, a snap-acting spring disc attached to said slider and spaced from said thermostatics disc, means connected with the edge of said spring disc for moving said edge axially, rotary means connected with said attaching means and threaded to said post for moving said attaching means axially without rotation and to obtain an axial reaction from said post, whereby manual rotation forces the spring disc downward to snap its center upward to cause the thermostatic disc to open the circuit without itself snapping, and whereby opposite rotation will move the center of said spring disc against the other stop to spring the center of said disc to move said thermostatic disc into circuit-closing position, said thermostatic disc being movable by temperature change into either one of its snap positions to open and close said circuit when the center of said spring is in depressed position.

11. A thermostatic switch comprising a line terminal, spaced first and second stops, a carriage movable between said stops, a snap-acting thermostatic member attached to said carriage and carrying a contact movable to and from engagement with said line terminal, a snap-acting deflecting spring attached to said carriage, means connected with a deflecting portion of the spring for bodily moving it whereby said spring may be forced in one direction upon engagement of the movable member with the first stop to snap said spring to cause the thermostatic member to separate its contact from the line terminal without itself snapping, opposite movement of the spring forcing the movable member against the second stop to snap the spring to move said thermostatic member bodily for engaging its contact against the line terminal, said thermostatic member snapping in response to temperature change to move its contact away from or toward said line terminal when said carriage member is located toward said first stop.

12. A thermostatic switch comprising line terminals, a guide having relatively fixed and spaced first and second stops, a carriage movable on said guide between said stops, a snap-acting thermostatic disc attached to said carriage and carrying contacts movable to and from engagement with said line terminals, a snap-acting spring disc having a deflecting edge and centrally attached to said carriage, means connected with the edge of the spring disc for bodily moving it whereby said spring disc may be forced in one direction upon engagement of the movable member with the first stop to snap the edge of said spring disc to cause the thermostatic disc to separate its contacts from the line terminals without itself snapping, opposite movement of the spring disc forcing the carriage against the second stop to snap the center of said spring disc to move said thermostatic disc bodily for engaging its contacts against the line terminals, said thermostatic disc snapping in response to temperature to move its contacts away from or toward said line terminals when said carriage is against said first stop.

13. A thermostatic switch comprising a base having line terminals thereon, a threaded guide post on the base having relatively fixed spaced first and second stops, a sliding carriage movable on the post between said stops, a snap-acting thermostatic disc having a deflecting edge attached to said carriage and carrying contacts movable to and from engagement with said line terminals, a snap-acting spring disc having a deflecting edge and centrally attached to said carriage, rotary control means threaded on the guide post and connected with the edge of the spring disc for axially moving it whereby said spring disc may be forced in one direction upon engagement of the carriage member with the first stop to snap the edge of said spring disc to cause the thermostatic disc bodily to move to separate its contacts from the line terminals without itself snapping, opposite axial movement of the spring disc in response to opposite rotation of the control means forcing the carriage against the second stop to snap the center of said spring disc to move said thermostatic disc bodily for engaging its contacts against the line terminals, and said thermostatic disc snapping in response to temperature to move its contacts away from contact or into contact with said line terminals when said carriage is against said first stop but said thermostatic disc being unable to close contact in any of its deflected positions when the carriage is against the second stop.

14. A thermostatic switch comprising a base having a line terminal thereon, a post fixed in the base, a snap-acting thermostatic disc having a contact thereon and centrally mounted on the post for movement between a normal cold position concave with respect to the base wherein the contact engages the terminal and a hot position convex with respect to the base wherein the contact and terminal are separated, a manually operable control knob mounted for limited axial movement on the post toward and away from said disc, and means carried by said knob and engageable with opposite surfaces of the disc at points adjacent its periphery for selectively pulling said disc from its concave to its convex position or pushing said disc from its convex to its concave position.

JOHN D. BOLESKY.
LEWIS W. BUELL.

REFERENCES CITED

The following references are of record in the file of this patent:

UNITED STATES PATENTS

| Number | Name | Date |
| --- | --- | --- |
| 2,199,388 | Bolesky | May 7, 1940 |
| 2,024,060 | Peralta | Dec. 10, 1935 |
| 1,767,709 | Smith | June 24, 1930 |